United States Patent
Ogawa

(10) Patent No.: US 8,347,324 B2
(45) Date of Patent: Jan. 1, 2013

(54) DISC IDENTIFYING DEVICE

(75) Inventor: Motoharu Ogawa, Maebashi (JP)

(73) Assignee: JVC Kenwood Corporation, Yokohama-shi (JP)

( * ) Notice: Subject to any disclaimer, the term of this patent is extended or adjusted under 35 U.S.C. 154(b) by 31 days.

(21) Appl. No.: 13/169,286

(22) Filed: Jun. 27, 2011

(65) Prior Publication Data

US 2012/0005696 A1 Jan. 5, 2012

(30) Foreign Application Priority Data

Jul. 5, 2010 (JP) ................................ 2010-152597

(51) Int. Cl.
*G11B 17/04* (2006.01)
(52) U.S. Cl. ........................................ 720/619; 720/645
(58) Field of Classification Search .................. 720/619, 720/645
See application file for complete search history.

(56) References Cited

U.S. PATENT DOCUMENTS

2006/0143631 A1* 6/2006 Watanabe ...................... 720/621
2009/0320053 A1* 12/2009 Izumiya et al. ............... 720/601

FOREIGN PATENT DOCUMENTS

JP 2002-42399 A 2/2002

* cited by examiner

*Primary Examiner* — Angel A. Castro
(74) *Attorney, Agent, or Firm* — Marvin A. Motsenbocker; Mots Law, PLLC

(57) ABSTRACT

A disc identifying device has sliders moving relatively in a direction such that a gap therebetween widens, one sensing switch switching-operated when a large diameter disc or a small diameter disc is inserted, the other sensing switch switching-operated only when the large diameter disc is inserted, and an actuating plate permitting the slider to move from an the initial position via a first position corresponding to the sensing switch to a second position corresponding to the sensing switch only when the large diameter disc is inserted. One end portion of the actuating plate has a stopper portion for preventing the slider from moving to the second position. The other end portion thereof is engaged with the slider.

4 Claims, 12 Drawing Sheets

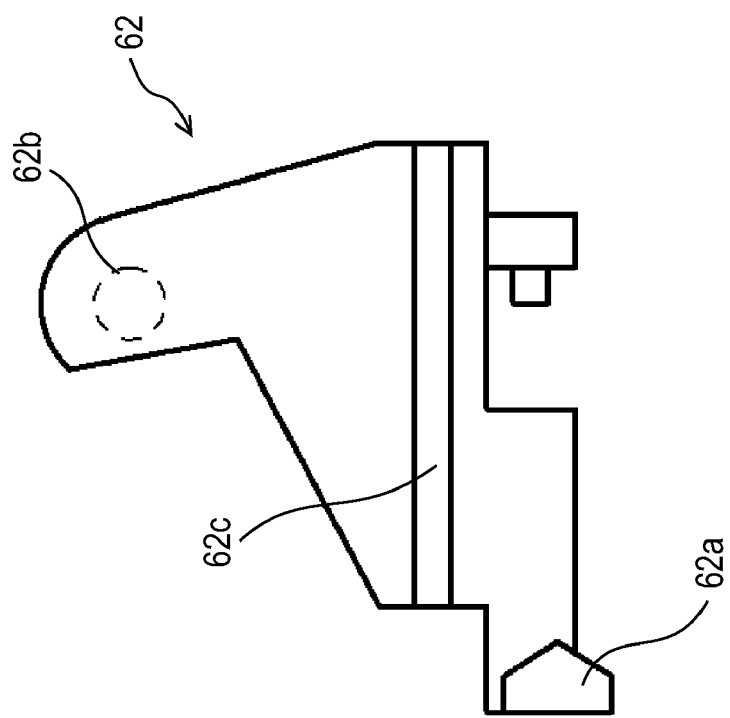
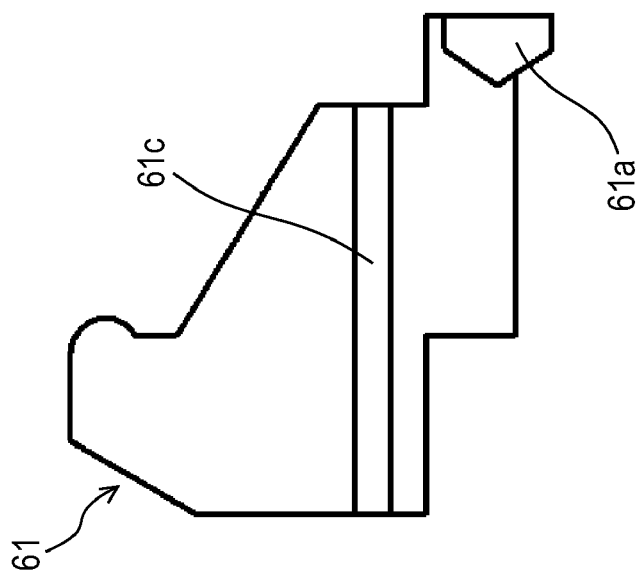

US 8,347,324 B2

DISC IDENTIFYING DEVICE

CROSS REFERENCE TO RELATED APPLICATIONS

This application claims priority based on 35 USC 119 from prior Japanese Patent Application No. P2010-152597 filed on Jul. 5, 2010, entitled "DISC IDENTIFYING DEVICE", the entire contents of which are incorporated herein by reference.

BACKGROUND OF THE INVENTION

1. Field of the Invention

The present invention relates to a disc identifying device, applied to a disc drive apparatus for reproducing information recorded on a disc and/or recording desired information on the disc, for identifying the type (size) of the disc when the disc is inserted into the apparatus.

2. Description of the Related Art

Conventionally, an 8 cm diameter optical disc (a small diameter disc), as well as a 12 cm diameter optical disc (a large diameter disc) has been known as a recording medium for recording information, for example music information. A disc drive apparatus for recording desired information on that type of disc or reproducing the recorded information therefrom has also been known. One type of the known disc drive apparatus is what is called a slot-in type disc drive apparatus, in which a disc inserted into an insert slot is transferred directly without using a tray for loading the disc to a drive position inside the apparatus by a transfer mechanism.

The time that takes for a disc to reach the drive position is different between the large diameter disc and the small diameter disc because of their difference in diameter. Therefore, the way in which the disc is transferred should change depending on the disc size because disc sizes cannot be positioned appropriately at the drive position. In addition, with models that do not support the small diameter disc, a problem arises that, for example, the small diameter disc is not guided to the drive position so that the disc cannot be removed from the inside of the apparatus.

For that reason, the slot-in type disc drive apparatus is usually provided with a disc identifying device for identifying whether the disc inserted into the insert slot of the apparatus is a large diameter disc or a small diameter disc.

A known example of such a disc identifying device is as follows (See, for example, Patent Document 1: JP-A-2002-042399 Paragraphs [0018] through [0021], FIGS. 1 through 3). The device has a pair of left and right pins slidable along a longitudinal direction of the insert slot and three switches disposed along the movement paths of the two pins. When a small diameter disc is inserted, one or two of the three switches is/are switching-operated by the pins and is/are turned on while a large diameter disc is inserted, all the three switches are switching-operated by the pins and are turned on.

According to Patent Document 1, three switches make it possible to identify whether the disc inserted in the insert slot is a large diameter disc or a small diameter disc, and allow the movable parts in the apparatus to operate appropriately.

However, the disc identifying device using the three switches for identifying two sizes of discs as disclosed in Patent Document 1 has a high cost in relation to the parts count and requires a complicated electric circuit for processing the output signals from those switches. In addition, the just-described disc drive device may occur a poor productivity in relation to fitting of the three switches. Moreover, it is necessary to ensure the space for accommodating the three switches which hinders size reduction of the apparatus.

SUMMARY OF THE INVENTION

The invention has been accomplished in view of the foregoing circumstances and it is an object of the invention to identify at least two sizes of discs accurately with as a small number of switches as possible.

In order to accomplish the foregoing object, the present invention provides:

(1) A disc identifying device comprising a first slider and a second slider moving relatively in a direction such that a gap between the first and second sliders widens when a disc having a diameter equal to or larger than a first diameter is inserted to the identifying device; a protruding portion pressed by an end of an inserted disc and provided on each sliders; a first sensing switch operated when the disc is inserted into the identifying device; a second sensing switch operated only when a disc having an diameter equal to or larger than a second diameter that is larger than the first diameter is inserted into the identifying device; an actuating plate permitting the first slider to move from an initial position via a first position at which the first sensing switch is performed to a second position at which the second sensing switch is performed with the protruding portion of the first slider pressed by a disc only when the disc having a diameter equal to or larger than the second diameter is inserted into the insert slot, wherein: one end portion of the actuating plate has a stopper portion for preventing the first slider from moving to the second position and the other end portion thereof is engaged with the second slider; and when the second slider moves to a predetermined position due to the pressing to the protruding portion by the disc, the actuating plate moving cooperatively with the second slider is moved from a movement path of the first slider to a release position at which the first slider is permitted to move to the second position of the first slider because the stopper portion is removed.

(2) In addition, the disc identifying device may further include a trigger lever for pressing the first slider toward the first position by receiving an operating force from the actuating plate moving toward the release position only when a disc having a smaller diameter than the second diameter is inserted from the insert slot in a condition in which the end of the disc presses the protruding portion of the second slider.

(3) In addition, the disc identifying device may further include a switching actuator member provided between the first slider and the first or second sensing switches for performing a switching operation of the first sensing switch and the second sensing switch by moving cooperatively with the first slider.

(4) In addition, the disc identifying device may further include a feed roller rotationally driven in obverse and reverse directions; a guide plate transferring the inserted disc with clamping cooperatively with the feed roller; wherein the actuating plate, the first slider, and the second slider are fitted to the guide plate.

In the disc identifying device according to the invention, an actuating plate that moves in cooperation with movement of the second slider is provided in addition to the first and second sliders each moving relatively in a direction such that the gap therebetween widens when a disc is inserted into the insert slot. By the actuating plate, the moving position of the first slider is changed restrictively between when a large diameter disc is inserted and when a small diameter disc is inserted. Therefore, by detecting the position of the first slider by the two sensing switches, it is possible to identify whether the disc inserted into the insert slot is a large diameter disc or a small diameter disc.

In other words, the invention makes it possible to identify size of disc with two sensing switches, which is one less than those in Patent Document 1. Therefore, cost reduction can be achieved.

In addition, in the embodiment in which the trigger lever is provided, the first slider located opposite the second slider is caused to move so as to cause one of the sensing switches to actuate even when the small diameter disc is inserted from one end (the second slider side) of the insert slot. Thereby, the insertion of the small diameter disc can be detected reliably.

In the embodiment in which the switching operation for the first and the second sensing switches is performed by the switching actuator member moving in cooperation with the first slider, it is possible to use, as sensing switches, contact-type sensors, which are less expensive than non-contact-type sensors such as optoelectronic switches. In addition, the freedom in designing relating to the arrangement of sensing switches can be increased by designing the shape of the switching actuator member.

Moreover, in the embodiment in which sliders and the actuating plate are fitted to the guide plate, it is unnecessary to ensure an additional location for installing sliders and the actuating plate. Therefore, sliders and the actuating plate can be incorporated in the existing disc drive apparatus without modifying the apparatus.

BRIEF DESCRIPTION OF DRAWINGS

FIG. 10 shows a plan view illustrating a pair of sliders.

DETAILED DESCRIPTION OF EMBODIMENTS

Hereinbelow, embodiments will be described in detail with reference to drawings. First, the internal structure of an information recording and reproducing apparatus, disc drive apparatus, equipped with a disc identifying device according to the embodiment is shown in FIG. 1, and the overall structure thereof will be described.

Figure 1:
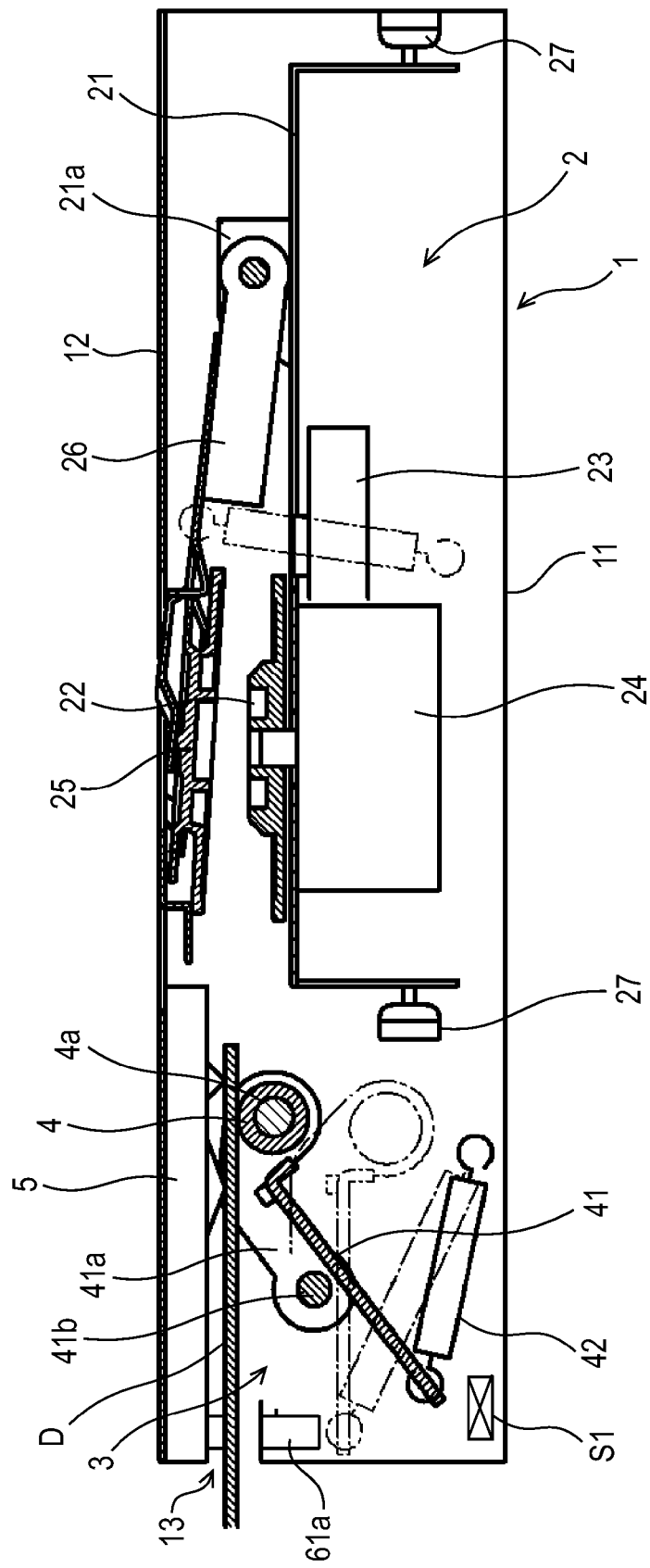
FIG. 1 is a side view showing the internal structure of a disc drive apparatus provided with a disc identifying device according to the embodiment.

In FIG. 1, reference numeral 1 denotes a case that forms the exterior of the apparatus. The case 1 has a base chassis 11 formed by press-molding a metal plate and a top plate 12 covering the upper portion of the base chassis 11. A horizontally long insert slot 13 for loading and ejecting a disc is formed in the front face of the case 1. Hereinafter, a disc having, for example, an 8 cm outer diameter as a first diameter is referred to as a small diameter disc d, and a disc having, for example, a 12 cm outer diameter as a second diameter greater than the first diameter is referred to as a large diameter disc D. Both are generically referred to as discs, which are denoted by reference character D.

Reference numeral 2 denotes a drive unit, which is commonly referred to as a transfer mechanism. This drive unit 2 is constructed by integrally fitting a turntable 22, an optical pickup 23, and so forth to a seat plate 21 made of a metal. The turntable 22 is a circular-shaped rotation member for supporting and rotating the disc D. The turntable 22 is directly coupled to a rotor shaft of a spindle motor 24 fixed to the seat plate 21 and is rotation driven in one direction. The optical pickup 23 is an electronic component unit for reading recorded information in the disc D or writing information into the disc D while moving in a radial direction of the disc D supported by the turntable 22. The optical pickup 23 has, for example, a light emitting element, such as laser diode, to generate light for irradiating a disc surface of the disc D, and a photoreceptor element for receiving reflected light from the disc D, as is known.

Reference numeral 25 denotes a clamping disk for rotatably sandwiching the disc D in cooperation with the turntable 22, and reference numeral 26 is a clamping base for rotatably retaining the clamping disk 25. One end portion of the clamping base 26 is pivotably supported by a bracket 21a formed on the seat plate 21. Thereby, the clamping disk 25 retained by the clamping base 26 is set at a standby position as shown in FIG. 1, and the clamping disk 25 is allowed to descend from the standby position to a position for clamping the disc D on the turntable 22.

The seat plate 21 constituting the drive unit 2 is elastically supported to the base chassis 11 via an anti-vibration damper 27, whereby the dropout and the like of the reproduced sound during disc driving can be reduced.

Reference numeral 3 denotes a disc transfer mechanism, for transferring the disc D, positioned between the drive unit 2 constructed as described above and the insert slot 13 formed in the case 1. The disc transfer mechanism 3 includes a feed roller 4 that is rotationally driven in obverse and reverse directions and a guide plate 5 fitted to the top plate 12.

The feed roller 4 is a slim rubber roller having a shaft length substantially equal to the diameter of the large diameter disc D. Both ends of a rotation shaft 4a of the feed roller 4 are rotatably supported by a pair of left and right brackets 41a (only one bracket 41a is shown in FIG. 1) formed at both ends of a flap plate 41. The flap plate 41 has a pivot shaft 41b pivotably attached to the base chassis 11 at one end portion of the bracket 41a. The flap plate 41 is allowed to swing in vertical directions with the pivot shaft 41b being the center. Thus, the feed roller 4 supported by the bracket 41a is allowed to ascend and descend between an evacuated position depicted by dash-dotted lines in FIG. 1 and a disc transfer position depicted by solid lines. At the disc transfer position depicted by solid lines, the feed roller 4 is allowed to transfer the disc D by clamping the disc D between the feed roller 4 and the guide plate 5.

The feed roller 4 is urged toward the disc transfer position by a spring 42 hooked between the flap plate 41 and the base chassis 11. When guiding the disc D onto the turntable 22, the feed roller 4 is pressed down toward the evacuated position by a cam member, which is not shown in the drawings, against the urging force of the spring 42. At the time point when the disc sits on the turntable 22, the feed roller 4 is at the evacuated position and is moved away from the disc D. Conversely, when transferring the disc D, the urging force of the spring 42 acts as the force for pressing the feed roller 4 against the disc D.

In the case 1, the disc identifying device according to the embodiment is provided on the insert slot 13 side. The disc identifying device automatically identifies a large diameter disc D or a small diameter disc d inserted into the insert slot 13. Based on the result of the identification, descending timing of the feed roller 4 and the clamping disk 25 (for example, starting of a motor, not shown, for moving the cam member), for example, is controlled. The structure of such a disc identifying device will be described later.

Figure 2:
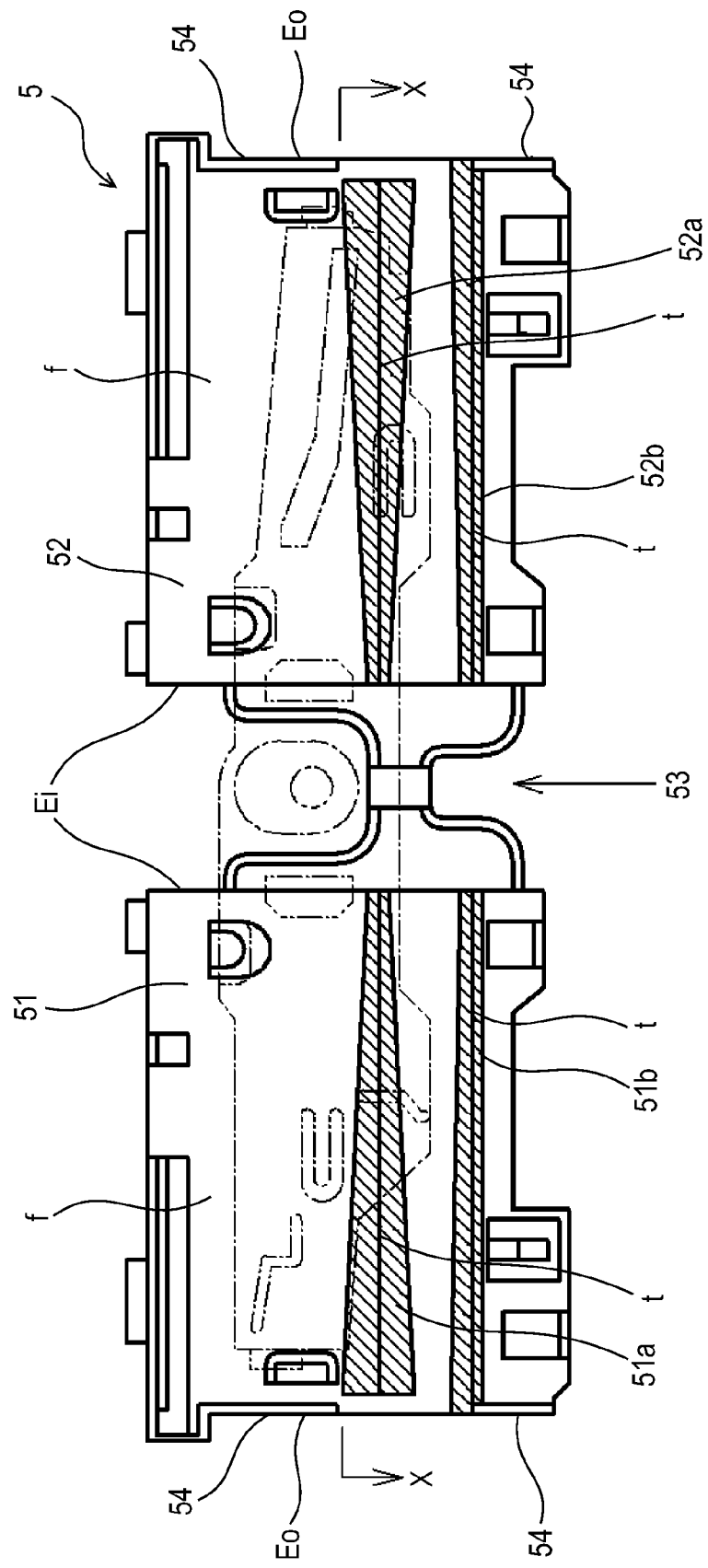
FIG. 2 shows a plan view illustrating a guide plate.

Next, referring to FIG. 2, the guide plate 5 includes a pair of left and right plate portions 51 and 52 and a coupling portion 53 interposed between the left and right plate portions 51 and 52, which are integrally formed from a molding material, such as a synthetic resin material. The pair of plate portions 51 and 52 is thin plates connected with the coupling portion interposed therebetween. Protruding threads with triangular cross section 51*a*, 51*b*, 52*a* and 52*b* each having a ridge line t extending toward an outer end portion Eo from an inner end portion Ei on the coupling portion 53 side, are formed on the respective surfaces f of plate portions 51 and 52. Note that in FIG. 2, the hatching is used for clearly indicating protruding threads 51*a*, 51*b*, 52*a* and 52*b* and is not used for indicating cross sections.

Figure 3:
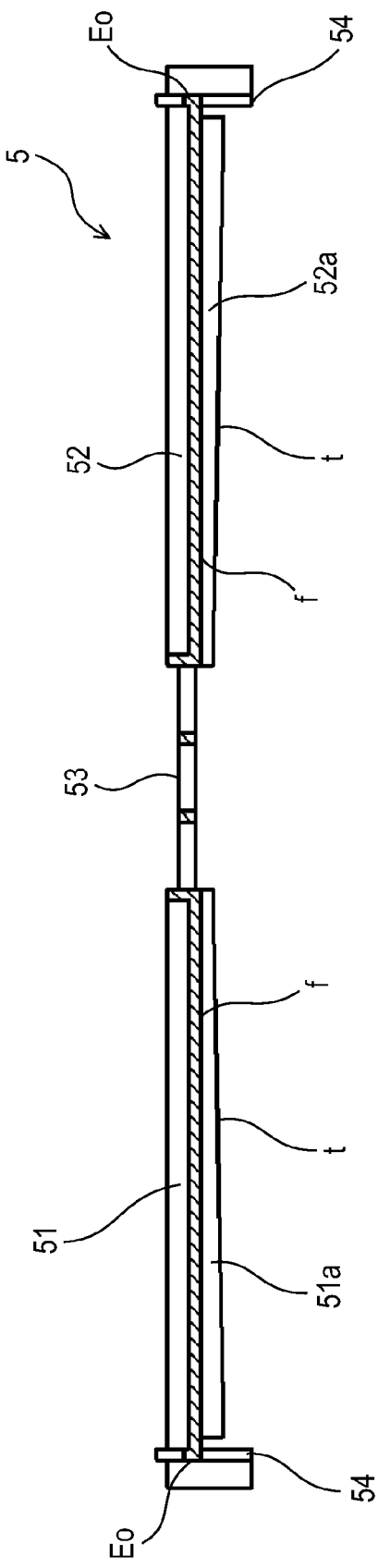
FIG. 3 shows a cross-sectional view taken along line X-X in FIG. 2.

As illustrated clearly in FIG. 3, protruding threads 51*a*, 51*b*, 52*a* and 52*b* (only protruding threads 51*a* and 52*a* are shown in FIG. 3) are in an inclined state with a height having a protruding amount from the surface f gradually increasing from the inner end portion Ei toward the outer end portion Eo, and the height difference thereof at the two ends is set at about 1 mm. Only the peripheral edge of the transferred disc D is made slide in the contact with the protruding threads 51*a* and 51*b* or/and 52*a* and 52*b*, whereby scratches to the disc D can be alleviated while the frictional resistance is alleviated during the transfer of the disc D.

Figure 4:
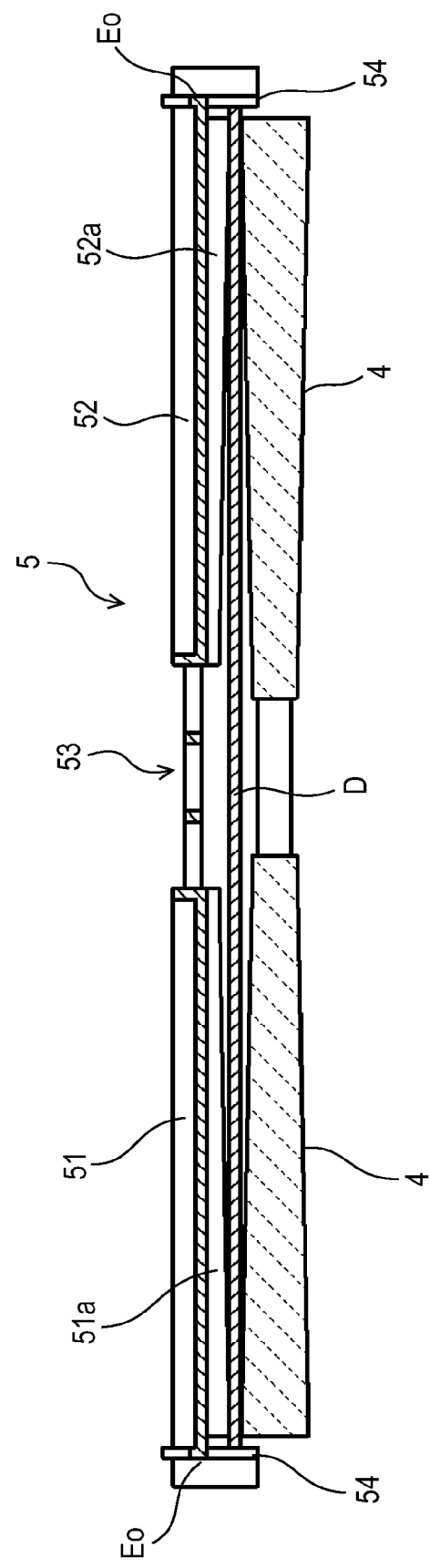
FIG. 4 shows a front view illustrating the state in which a disc is clamped by a feed roller and a guide plate.

In addition, as described clearly in FIGS. 3 and 4, a side guide 54 projecting from the outer end portion Eo in a direction orthogonal to the surface f is formed in the surface f side of each the pair of plate portions 51 and 52. The left and right peripheral edges of the transferred large diameter disc D slidably contact with the side guides 54 of the two plate portions 51 and 52, whereby the centering of the large diameter disc D is achieved. Note that the centering of the small diameter disc d is carried out by another means, but the description thereof is omitted.

As illustrated clearly from FIG. 4, the feed roller 4 has a shape such that the diameter gradually increases from the central portion toward both end portions, whereby both end portions of the feed rollers 4 make contact with only the peripheral edge of the disc D also on the other side of the disc. Thus, the disc D is transferred while both left and right edges thereof are being clamped uniformly by the feed rollers 4 and protruding threads 51*a*, 51*b*, 52*a* and 52*b*.

Figure 5:
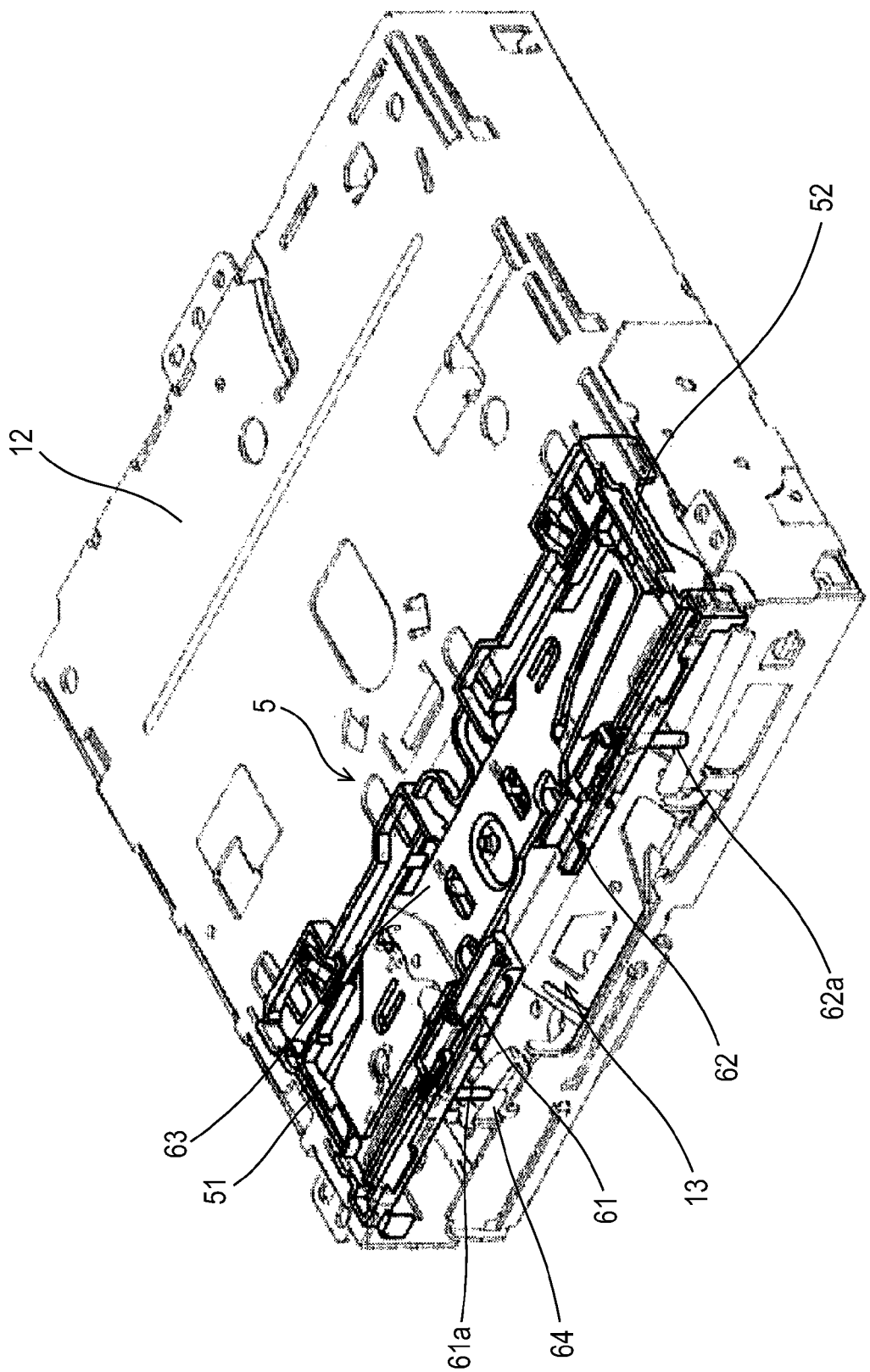
FIG. 5 shows a perspective view illustrating the state in which the disc identifying device according to the embodiment is assembled.

Next, the structure of the disc identifying device will be discussed. As illustrated in FIG. 5, the disc identifying device is constituted by fitting a pair of left and right sliders 61 and 62 (the first slider and the second slider) and an actuating plate 63 to the guide plate 5. Sliders 61 and 62 are capable of relatively moving in such directions that the gap therebetween widens along the front edge of the guide plate 5, with the position shown in FIG. 5 being the initial position. Protruding portions 61*a* and 62*a*, extending downward from plate portions 51 and 52 of the guide plate 5 toward the rear of the insert slot 13, are formed at respective one end portions of sliders 61 and 62. Protruding portions 61*a* and 62*a* of the two sliders are arranged so as to have a gap less than the diameter of the small diameter disc d at the initial position (for example, a gap of 7 cm). When the disc D is inserted into the insert slot 13, the end of the disc D presses two protruding portions 61*a* and 62*a* so that the gap widens so as to permit the disc D to pass between protruding portions 61*a* and 62*a*.

Figure 6:
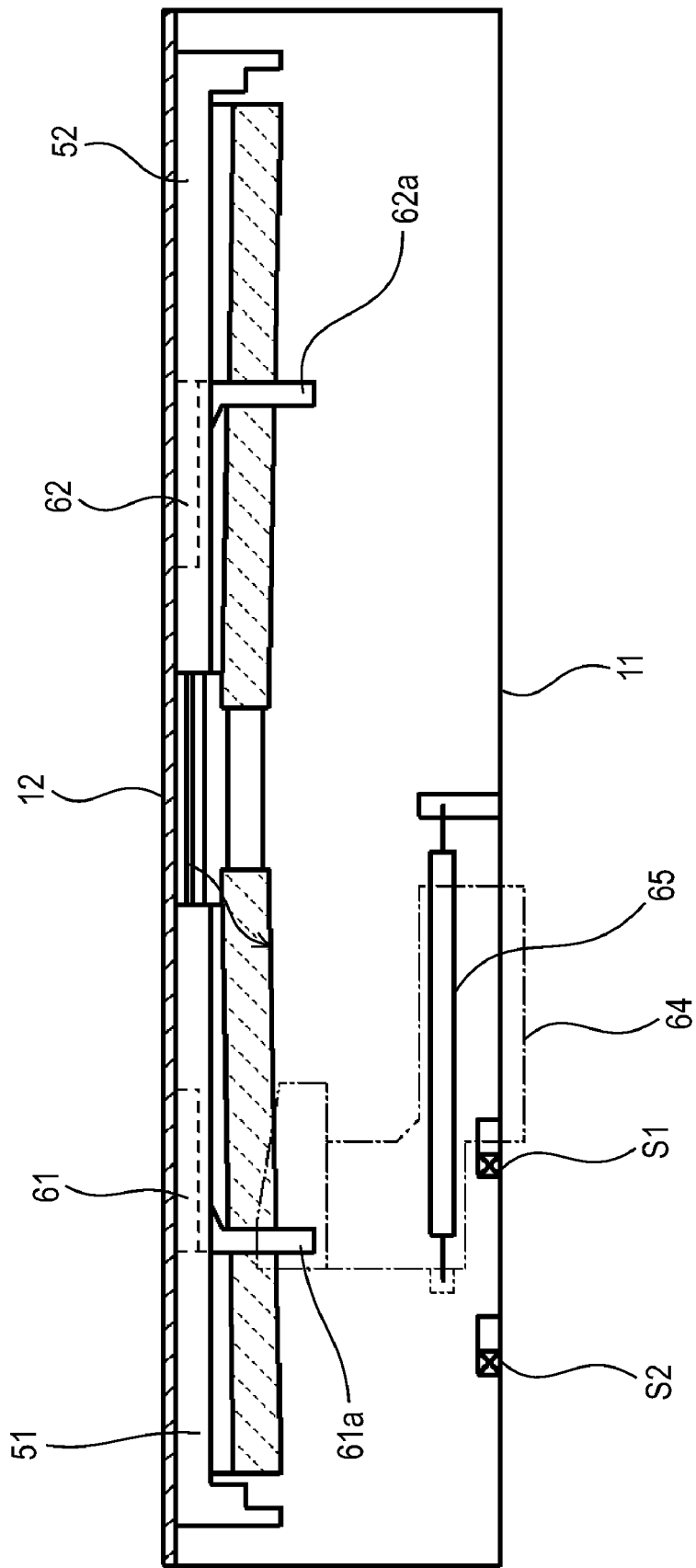
FIG. 6 shows a schematic front view illustrating the disc identifying device viewed from the insert slot side.

As illustrated in FIGS. 5 and 6, a switching actuator member 64 engaged with one of the protruding portions, the protruding portion 61*a*, is provided near the insert slot 13. The switching actuator member 64 is configured to be movable along the longitudinal direction of the insert slot 13, like the slider 61, and is urged by a spring 65 shown in FIG. 6 toward the right side of the figure. Thus, when the protruding portion 61*a* is pressed by the end of the disc D and moves toward the left side of FIG. 6, the switching actuator member 64 accordingly moves in the same direction against the urging force of the spring 65. When the pressing force to the protruding portion 61*a* from the disc D is lost, the slider 61 having the protruding portion 61*a* is returned to the initial position by the urging force of the spring 65, together with the switching actuator member 64, and is retained at the initial position.

Figure 7:
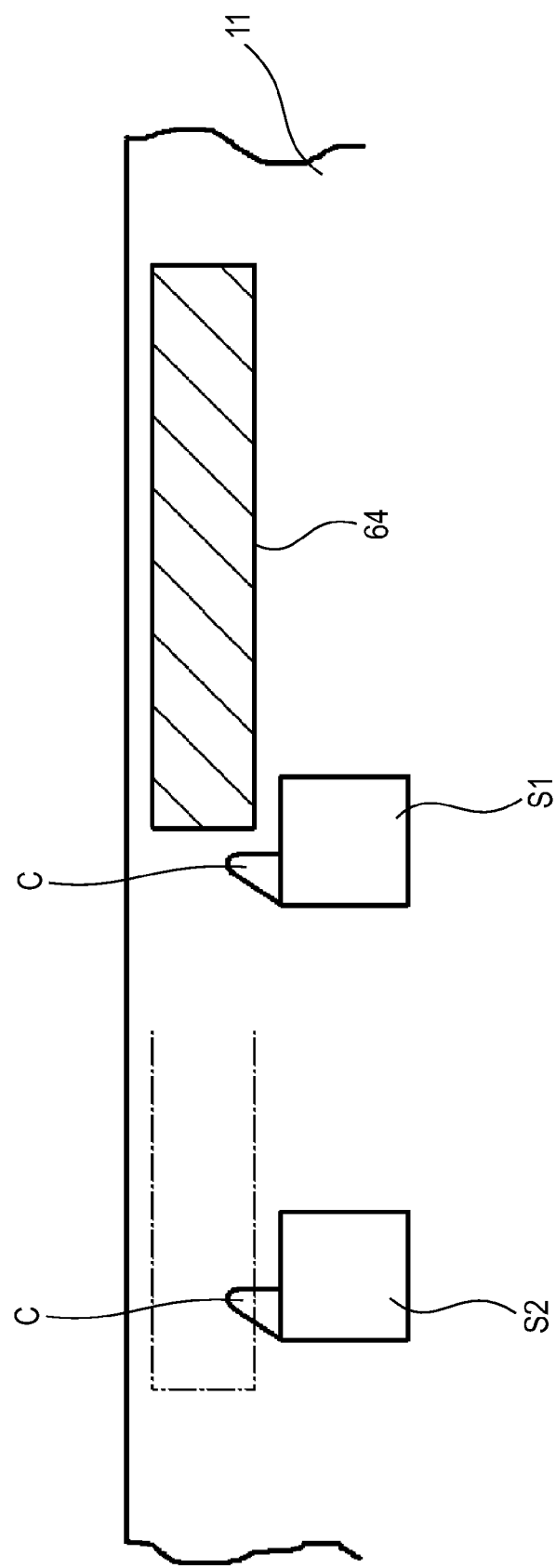
FIG. 7 shows a schematic view illustrating the portion at which sensing switches are disposed.

As illustrated in FIGS. 6 and 7, two sensing switches S1 and S2 (the first sensing switch and the second sensing switch) are disposed at a predetermined gap on the bottom portion of the base chassis 11 along the movement path of the switching actuator member 64. Each of sensing switches S1 and S2 is a contact-type sensor (for example, a microswitch) having a contact c. Thereby, it is made possible to identify which one of the large diameter disc D or the small diameter disc d has been inserted into the insert slot 13 by the state of two sensing switches S1 and S2 (for example, the on-off state) while detecting the position of one of the sliders, the slider 61.

Here, the slider 61 is configured as follows. The position at which the sensing switch S1 is switching-operated (the contact c is press-operated) by the switching actuator member 64 is defined as the first position, and the position at which the contact c of the sensing switch S2 is press-operated by the switching actuator member 64 is defined as the second position. When a small diameter disc d is inserted into the insert slot 13, the slider 61 is permitted to move only from the initial position to the first position. When a large diameter disc D is inserted, the slider 61 is permitted to move from the initial position via the first position to the second position.

Accordingly, it can be determined that the disc D is not inserted in the insert slot 13 when both sensing switches S1 and S2 are kept in the off state. The disc D inserted in the insert slot 13 can be identified as the small diameter disc d when the sensing switch S2 is not turned on within a predetermined time after the sensing switch S1 is turned on, or when the sensing switch S1 shifts from "on" to "off" without turning the sensing switch S2 "on." Also, the disc D inserted in the insert slot 13 can be identified as the large diameter disc D when the sensing switch S2 is turned on within a predetermined time after the sensing switch S1 is turned on. The details of such an operation will be described later.

Figure 8:
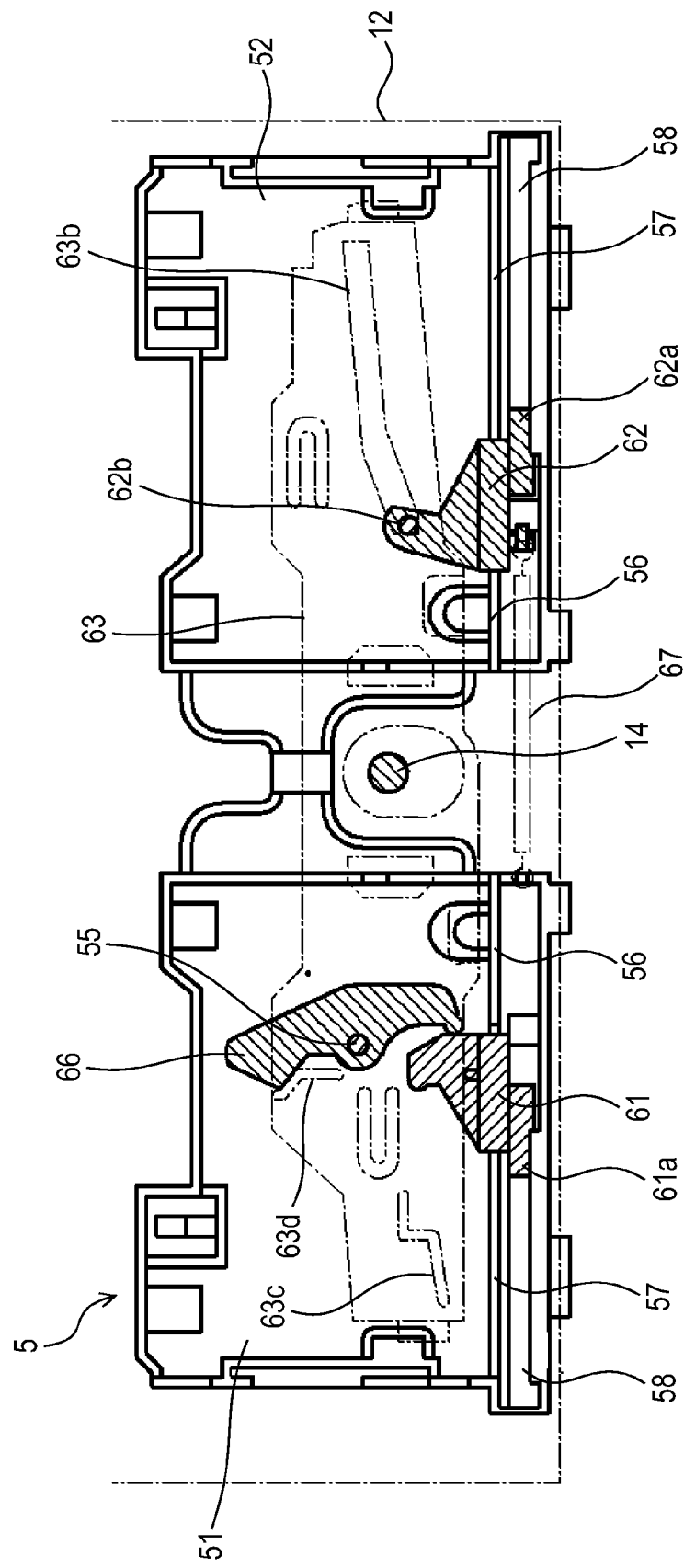
FIG. 8 shows an illustrative view showing the arrangement locations of constituting components of the disc identifying device according to the embodiment.
Figure 9:
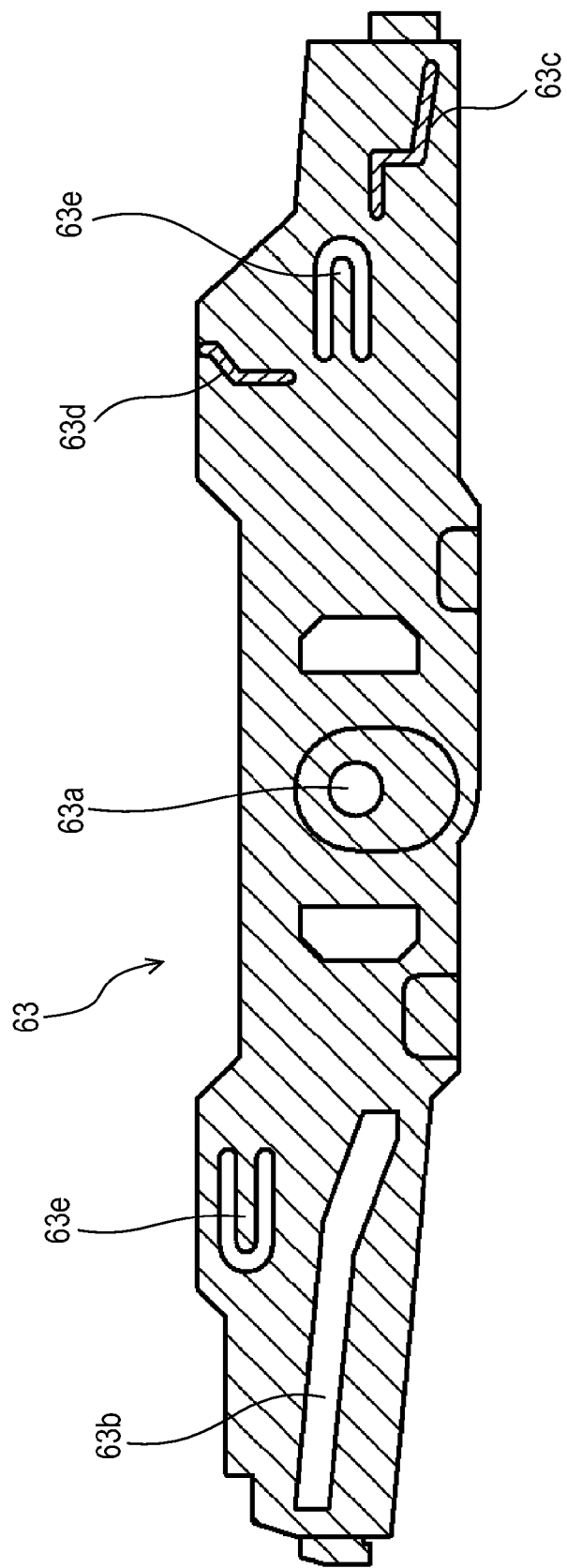
FIG. 9 shows a plan view illustrating an actuating plate viewed from the guide plate side.

Next, referring to FIGS. 8 and 9, the actuating plate 63 is a strip-shaped thin plate that is slightly shorter than the guide plate 5. A mounting hole 63*a* is formed at a central portion of the actuating plate 63. The actuating plate 63 is located between the guide plate 5 and the top plate 12, and is pivotably attached to the top plate 12 by a pin 14 that passes through the mounting hole 63*a*. Both ends of the actuating plate 63 are allowed to swing about the pin 14 being the center. A cam hole 63*b* bent into a wide V-shape is formed in one longitudinal end portion of the actuating plate 63. A Z-shaped stopper portion 63*c* and a protruding piece 63*d* bent in a wide V-shape are provided in the other end portion thereof so as to protrude therefrom.

The slider 62 is provided with a slide pin 62*b*, which is inserted into the cam hole 63*b*. When one of the sliders, the slider 62, is at the initial position shown in FIG. 8, the stopper portion 63*c* is positioned on the movement path of the other one of the sliders, the slider 61, to prevent the slider 61 from moving to the second position. When the slider 62 moves from the initial position toward the right side of FIG. 8, the actuating plate 63 swings clockwise in FIG. 8 about the pin 14 being the center due to the positional change of the slide pin 62*b* relative to the cam hole 63*b*. And then the stopper portion 63*c* is removed from the movement path of the slider 61. The actuating plate 63 has elastic contact pieces 63*e* that are partially cut away form to a U-shape. The elastic contact pieces 63*e* elastically contacts with the top plate 12 so that the actuating plate 63 can be prevented from rattling.

As described clearly in FIG. 8, in addition to the sliders 61 and 62 and the actuating plate 63, a trigger lever 66 are fitted on the back side of the guide plate 5 (the side facing the top plate 12). Reference numeral 55 denotes a boss protruding from the guide plate 5 (the plate portion 52) and serving as the pivot shaft of the trigger lever 66. The trigger lever 66 is configured to be swingable about the boss 55 being the center.

As illustrated in FIG. 8, when the pair of sliders 61 and 62 are at the initial position, one end portion of the trigger lever 66 is in contact with an edge portion of the slider 61, and the other end portion of the trigger lever 66 makes contact with the protruding piece 63*d* of the actuating plate 63. Thereby, the trigger lever 66 is restrained from swinging about the boss 55 being the center. On the other hand, when the slider 62 is moved from the initial position toward the right side of FIG. 8 to a predetermined position by the insertion of the disc D into the insert slot 13, the actuating plate 63 swings about the pin 14 being center. Thereby, for example, even in the case where the small diameter disc d is inserted while only the slider 62 is moving, one end portion of the trigger lever 66 is being pressed by the protruding piece 63*d* of the actuating plate 63 to cause the trigger lever 66 to swing and the other end portion of the trigger lever 66 presses the slider 61 which is at the initial position toward the first position. That is, even in the case where the small diameter disc d is inserted from the right side of FIG. 8 and only the protruding portion 62*a* of the slider 62 is pressed by the end of the disc, the slider 61 can be moved to the first position by the actuating plate 63 and the trigger lever 66 so the insertion of the small diameter disc d can be detected.

The slider 61 is urged toward the initial position by the spring 65 (see FIG. 6) as described above, and the other slider 62 is urged toward the initial position by a spring 67 (see FIG. 8) hooked between the guide plate 5 and the slider 62. In FIG. 8, reference numeral 56 denotes protruding pieces formed on the guide plate 5 to retain the sliders 61 and 62 at the initial position against the urging force by the springs 65 and 67. Reference numeral 57 denotes guide rails for guiding the movement of the sliders 61 and 62. Guide rails 57 are extended continuously from the protruding pieces 56 so as to project lower one step than the protruding pieces 56. In sliders 61 and 62, guide grooves 61*c* and 62*c* are formed corresponding to guide rails 57, as shown in FIG. 10. In FIG. 8, reference numeral 58 denotes long holes formed in the guide plate 5 along respective guide rails 57. Protruding portions 61*a* and 62*a* of sliders 61 and 62 are passed through the long holes 58.

Figure 11A:
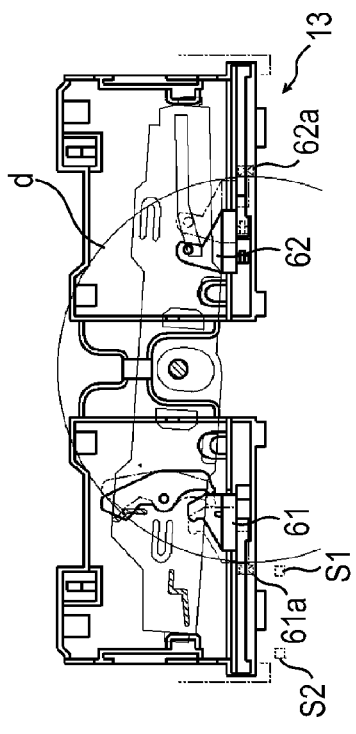
FIG. 11 shows a view illustrating the operation when a small diameter disc is inserted.

Here, operations and workings of the above-mentioned identifying device will be described in FIGS. 11 and 12. First, referring to FIG. 11, the operation when the small diameter disc d is inserted will be described. FIG. 11A shows the state in which the small diameter disc d is inserted into the center of the insert slot 13. At this time, the pair of left and right sliders 61 and 62 move from the initial position indicated by solid line in directions such that the gap therebetween widens indicated by dash-dotted line, because protruding portions 61*a* and 62*a* of sliders 61 and 62 are pressed by the end face of the small diameter disc d. In particular, the switching actuator member 64 shown in FIG. 6 moves in cooperation with one of sliders, the slider 61, in the same direction as the slider 61 and this movement allows to perform a switching operation for the sensing switch S1 (a pressing operation for the contact c). That is, while the protruding portion 61*a* of the slider 61 is being pressed by the end face of the small diameter disc d, the slider 61 moves to the first position at which the sensing switch S1 is switching-operated but the slider 61 does not reach the second position at which the sensing switch S2 is switching-operated, relating to the diameter of the small diameter disc d. Therefore, although a signal is input from the sensing switch S1 to a control unit, which is conductively connected to sensing switches S1 and S2, not shown, a signal is not input from the sensing switch S2 even after a predetermined time (for example, 1 second) has elapsed from the time point of the input. Therefore, the control unit determines that the small diameter disc d has been inserted into the insert slot 13 and executes a specific control process. When the sensing switch S1 is turned on, the feed roller 4 shown in FIG. 1 is rotationally driven immediately to start pulling the disc D. When the inserted disc D is identified as the small diameter disc d, the following process is executed as the specific control process. In the case of a model that supports the small diameter disc d, the start of the movement of a cam member, not shown, for raising and lowering the feed roller 4 is earlier than when the large diameter disc D is inserted, for example. In the model that does not support the small diameter disc d, the process shifts to the operation for ejecting the small diameter disc d by reverse-rotating the feed roller 4, which has been loaded halfway, from the insert slot 13.

Figure 11B:
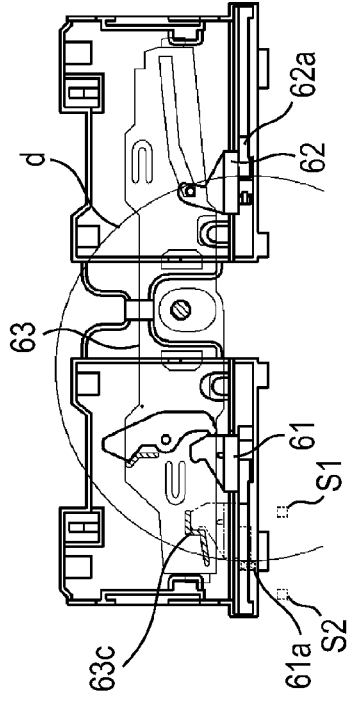

FIG. 11 shows the state in which the small diameter disc d is inserted from the left end of the insert slot 13. At this time, only one of sliders, the slider 61, moves alone in the direction away from the other slider, the slider 62, since the protruding portion 61*a* of the slider 61 is pressed by the small diameter disc d. However, the stopper portion 63*c* of the actuating plate 63 sits on the movement path and prevents the slider 61 from proceeding to the second position. As a result, although the slider 61 moves to the first position, it does not reach the second position. Thereby, the control unit determines that the small diameter disc d has been inserted into the insert slot 13 and executes a specific control process in the same manner as described above.

Figure 11C:
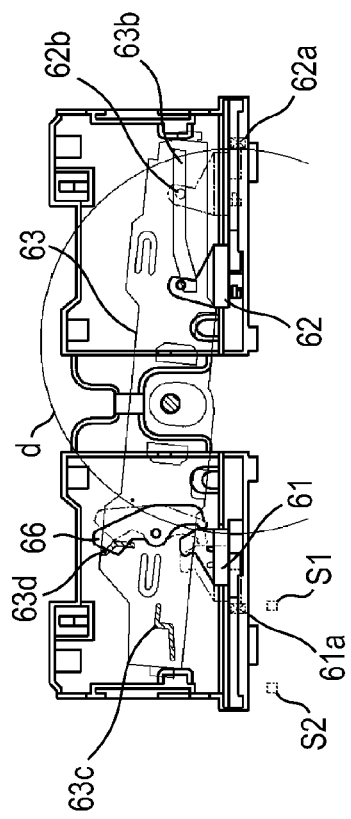
Figure 12:
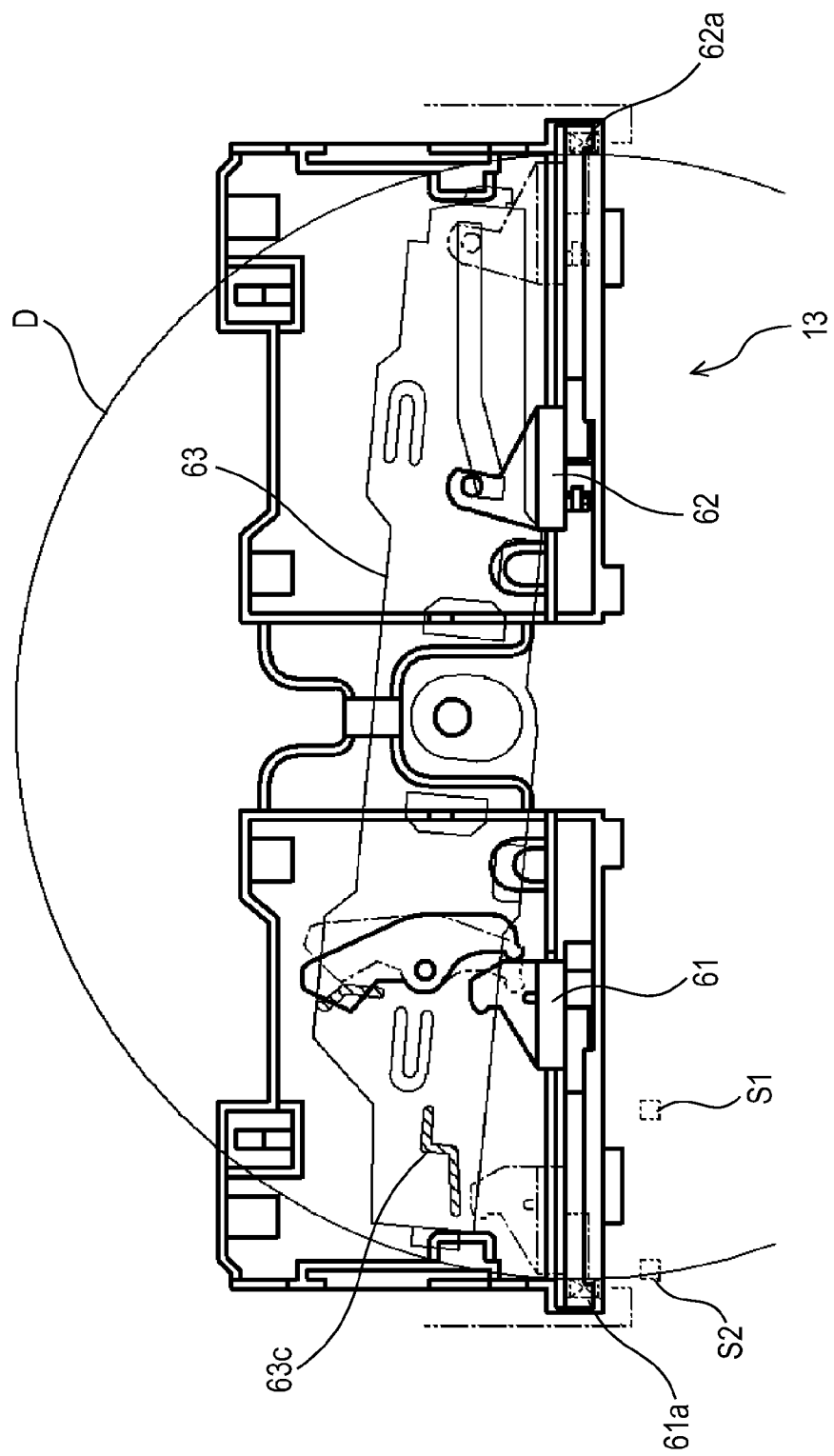
FIG. 12 shows a view illustrating the operation when a large diameter disc is inserted.

FIG. 11C shows the state in which the small diameter disc d is inserted from the right end of the insert slot 13. At this time, only one of sliders, the slider 62, moves in advance in the direction away from the other slider, the slider 61, since the protruding portion 62*a* of the slider 62 is pressed by the small diameter disc d. When the slider 62 starts to move, the actuating plate 63 starts to swing due to the change in position of the slide pin 62*b* relative to the cam hole 63*b* and at the time point at which the slider 62 has reached a predetermined position, the protruding piece 63*d* of the actuating plate 63 presses one end portion of the trigger lever 66. As a result, the trigger lever 66 swings and presses the slider 61 toward the first position. As described clearly in FIG. 11C, when the small diameter disc d is inserted from the right end (the slider 62 side) of the insert slot 13, the actuating plate 63 swings and moves to the position (the release position) at which the stopper portion 63c is removed from the movement path of the slider 61. At this time, the end face of the small diameter disc d does not press the protruding portion 61a of the slider 61 in relation to the diameter of the small diameter disc d. Therefore, the slider 61 does not reach the second position and the trigger lever 66 moves the slider 61 only to the first position. As a result, the control unit determines that the small diameter disc d has been inserted into the insert slot 13 and executes a specific control process in the same manner as described above.

Next, referring to FIG. 12, the operation when the large diameter disc D is inserted will be described. When the large diameter disc D is inserted, protruding portions 61a and 62a of the pair of sliders 61 and 62 are pressed inevitably by the end face of the large diameter disc D, in relation to the diameter thereof. As a result, sliders 61 and 62 move in such directions which the gap therebetween widens, while protruding portions 61a and 62a are being pressed by the large diameter disc D. Approximately when the slider 61 moves to the position of the stopper portion 63c, the other slider 62 reaches a predetermined position. Thereby, the actuating plate 63 swings and moves to the release position shown in FIG. 12. As a result, the slider 61 moves to the second position without being hindered by the stopper portion 63c while the protruding portion 61a is being pressed by the large diameter disc D. Therefore, the control unit receives signals from both sensing switches S1 and S2. As a result, the control unit determines that the large diameter disc D has been inserted into the insert slot 13 and executes a specific control process corresponding to the large diameter disc D.

Hereinabove, embodiments of the invention has been described. However, the trigger lever 66 is not always necessary. For example, the gap between sliders 61 and 62 at the initial position may be made narrower, when the small diameter disc d is inserted from the side of one of sliders, the slider 62 side, the small diameter disc d can press the protruding portion 61a of the other one of sliders, the slider 61, so as to move the slider 61 to the first position. Thereby, the trigger lever 66 can be eliminated but it is still possible to identify the disc D as the small diameter disc d while detecting insertion of the disc D even when the small diameter disc d is inserted from the side of one of sliders, the slider 62 side.

In addition, sensing switches S1 and S2 may be disposed along the movement path of the slider 61 so that sensing switches S1 and S2 can be switching-operated by the slider 61. Thereof, it possible to eliminate the switching actuator member 64.

Moreover, sensing switches S1 and S2 are not limited to the ones that are turned on when the contacts c thereof are pressed and sensing switches S1 and S2 may be turned off when the contacts c thereof are pressed.

What is claimed is:

1. A disc identifying device comprising:
a first slider and a second slider moving relatively in a direction such that a gap between the first and second sliders widens when a disc having a diameter equal to or larger than a first diameter is inserted to the identifying device;
a protruding portion pressed by an end of an inserted disc and provided on each sliders;
a first sensing switch operated when the disc is inserted into the identifying device;
a second sensing switch operated only when a disc having an diameter equal to or larger than a second diameter that is larger than the first diameter is inserted into the identifying device;
an actuating plate permitting the first slider to move from an initial position via a first position at which the first sensing switch is performed to a second position at which the second sensing switch is performed with the protruding portion of the first slider pressed by a disc only when the disc having a diameter equal to or larger than the second diameter is inserted into the insert slot, wherein:
one end portion of the actuating plate has a stopper portion for preventing the first slider from moving to the second position and the other end portion thereof is engaged with the second slider; and
when the second slider moves to a predetermined position due to the pressing to the protruding portion by the disc, the actuating plate moving cooperatively with the second slider is moved from a movement path of the first slider to a release position at which the first slider is permitted to move to the second position of the first slider because the stopper portion is removed.

2. The disc identifying device according to claim 1, further comprising a trigger lever for pressing the first slider toward the first position by receiving an operating force from the actuating plate moving toward the release position only when a disc having a smaller diameter than the second diameter is inserted from the insert slot in a condition in which the end of the disc presses the protruding portion of the second slider.

3. The disc identifying device according to claim 1, further comprising a switching actuator member provided between the first slider and the first or second sensing switches for performing a switching operation of the first sensing switch and the second sensing switch by moving cooperatively with the first slider.

4. The disc identifying device according to claim 1, further comprising a feed roller rotationally driven in obverse and reverse directions;
a guide plate transferring the inserted disc with clamping cooperatively with the feed roller;
wherein the actuating plate, the first slider, and the second slider are fitted to the guide plate.

* * * * *